No. 785,510. PATENTED MAR. 21, 1905.
W. H. MILLER & A. N. PIERMAN.
MOLD FOR DUPLICATE PHONOGRAPH RECORDS.
APPLICATION FILED FEB. 26, 1903.
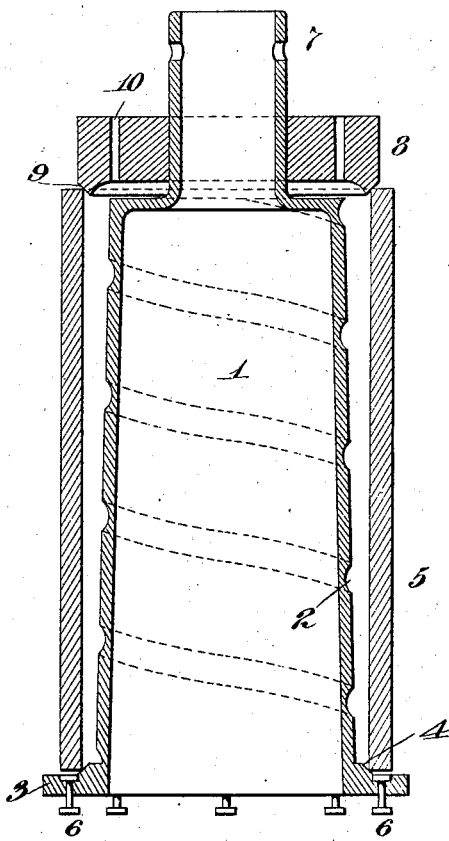
Witnesses:
Inventors No. 785,510.

Patented March 21, 1905.

UNITED STATES PATENT OFFICE.

WALTER H. MILLER, OF ORANGE, AND ALEXANDER N. PIERMAN, OF NEWARK, NEW JERSEY, ASSIGNORS, BY MESNE ASSIGNMENTS, TO NEW JERSEY PATENT COMPANY, OF WEST ORANGE, NEW JERSEY, A CORPORATION OF NEW JERSEY.

MOLD FOR DUPLICATE PHONOGRAPH-RECORDS.

SPECIFICATION forming part of Letters Patent No. 785,510, dated March 21, 1905.

Application filed February 26, 1903. Serial No. 145,189.

*To all whom it may concern:*

Be it known that we, WALTER H. MILLER, residing at Orange, and ALEXANDER N. PIERMAN, residing at Newark, in the county of Essex and State of New Jersey, both citizens of the United States, have invented a certain new and useful Improvement in Molds for Duplicate Phonograph-Records, of which the following is a description.

Our invention relates to an improved mold for making duplicate phonograph-records, preferably of the type described in Letters Patent No. 726,966, dated May 5, 1903, wherein the wax or wax-like material is intimately associated with a fibrous material throughout its mass. The mold may, however, be employed for producing duplicate phonograph-records composed of a wax or wax-like material throughout or for the manufacture of blanks. In Letters Patent No. 726,965, dated May 5, 1903, we describe an improved process for making duplicate phonograph-records in which a mold is used having a core concentrically arranged therein, the wax or wax-like material in molten condition being introduced upwardly into the space between the mold and core. Some difficulty has been experienced in practice with this apparatus, as sometimes the mold is accidentally shifted radially with respect to the core, so that the bore of the resulting duplicate is somewhat eccentric with respect to the record-surface.

The essential object of the present invention, therefore, is to provide a mold in which the core will during the setting or cooling of the material be maintained exactly concentric to the mold, so as to thereby overcome the objection pointed out.

To this end the invention consists in providing the core with an inclined shoulder which is engaged by the bottom edge of the mold and in utilizing a separate heading-disk for engaging the core and provided with an inclined shoulder which engages the upper end of the mold, whereby the mold will automatically be centered with respect to the core during the cooling of the material.

In order that the invention may be better understood, attention is directed to the accompanying drawing, forming a part of this specification, and in which we illustrate a sectional view of the preferred manner of carrying our invention into effect.

The core 1 is hollow and is preferably formed with a spiral groove 2, so as to permit it to be readily removed from the finished duplicate, as well as to form a spiral rib on the latter for engagement with the mandrel of the phonograph. The core is formed with a base 3, having an inclined shoulder 4, with which the inner bottom edge of the mold 5 engages. This mold is made in any suitable way and carries a negative representation of the record on its bore. If the apparatus is to be used for molding blanks, the mold is provided with a smooth bore. A series of headed pins 6 are mounted in the base 3, as we describe in our said Patent No. 726,965, for supporting the mold, the arrangement being such that when the parts are assembled and introduced into a tank containing a molten wax-like material the pins will elevate the mold to permit the wax-like material to enter the space between the mold and core. The upper portion 7 of the core is made cylindrical and receives a heading-disk 8, formed with an inclined shoulder 9, which engages the inner edge of the upper end of the mold, as shown. This heading-disk may be provided with one or more vents 10 to permit of the escape of air from the space between the mold and core.

In operation the mold is first inserted over the core and the heading-disk 8 engaged with its upper end. The mold and core are now introduced into the molten material, and the pins 6 will elevate the mold to permit the molten material to enter the space between the mold and core. If practically indestructible duplicates are to be produced, as we describe in our Patent No. 726,966, a mass of fibrous material, such as cotton-wool, is first loosely wound around the core, so that the molten wax-like material will thoroughly impregnate the same. When the space between the mold and core has been filled to the proper height with the molten wax-like material, the parts are removed by a suitable bail applied to the core, thus permitting the mold to descend until the inner edge of its lower end engages the shoulder 4, so as to prevent the escape of the material. The heading-disk 8 also descends and by its engagement with the upper end of the mold effectively centers the same. As soon as the material has sufficiently cooled the heading-disk is removed, the core unscrewed from the resulting duplicate, and the latter is then contracted by further cooling until it may be removed from the mold.

Having now described our invention, what we claim is—

1. In apparatus of the character described, the combination with a cylindrical one-piece metal mold, of a core within the same having a tapered shoulder upon which one edge of the mold rests, loosely engaging the same, substantially as set forth.

2. In apparatus of the character described, the combination with a cylindrical one-piece metal mold, of a core within the same having a tapered shoulder upon which the inner edge of the mold rests, loosely engaging the same, substantially as set forth.

3. In apparatus of the character described, the combination with a cylindrical mold, of a core within the same having a tapered shoulder with which one edge of the mold engages, and a heading-disk carried by the core having an inclined shoulder for engaging an opposite edge of the mold, substantially as set forth.

4. In apparatus of the character described, the combination with a cylindrical mold, of a core within the same having a tapered shoulder with which one of the inner edges of the mold engages, and a heading-disk carried by the core having an inclined shoulder for engaging the opposite inner edge of the mold, substantially as set forth.

5. In apparatus of the character described, the combination with a cylindrical mold, of a core having an inclined shoulder with which one of the edges of the mold engages, and a series of pins for moving the mold longitudinally with respect to the core, substantially as set forth.

6. In apparatus of the character described, the combination with a cylindrical mold, of a core having an inclined shoulder with which one of the edges of the mold engages, a series of pins for moving the mold longitudinally with respect to the core, and a heading-disk carried by the core having an inclined shoulder for engaging an opposite edge of the mold, substantially as set forth.

This specification signed and witnessed this 24th day of February, 1903.

WALTER H. MILLER.
ALEXANDER N. PIERMAN.

Witnesses:
JNO. ROBT. TAYLOR,
JOHN LOUIS LOTSCH.